(12) United States Patent
Schoenfeld et al.

(10) Patent No.: US 7,019,102 B2
(45) Date of Patent: Mar. 28, 2006

(54) BLOCKED POLYURETHANE PREPOLYMERS USEFUL IN COATING COMPOSITIONS

(75) Inventors: Rainer Schoenfeld, Duesseldorf (DE); Corina Bisog, Franklin, WI (US); David Sturgill, Brookfield, WI (US); Kazuhiko Sato, Franklin, WI (US)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 60 days.

(21) Appl. No.: 10/871,891

(22) Filed: Jun. 18, 2004

(65) Prior Publication Data

US 2005/0282990 A1 Dec. 22, 2005

(51) Int. Cl.
*C08G 18/80* (2006.01)

(52) U.S. Cl. .................. 528/45; 525/124; 525/127

(58) Field of Classification Search ............ None
See application file for complete search history.

(56) References Cited

U.S. PATENT DOCUMENTS

| | | | |
|---|---|---|---|
| 4,618,653 A | 10/1986 | Kawakubo et al. |
| 4,977,201 A | 12/1990 | Ogawa et al. |
| 5,030,673 A | 7/1991 | Sugino et al. |
| 5,043,379 A | 8/1991 | Ota et al. |
| 5,087,664 A | 2/1992 | Sugino et al. |
| 5,155,154 A | 10/1992 | Krummel et al. |
| 5,284,918 A | 2/1994 | Huynh-Tran et al. |
| 5,453,458 A | 9/1995 | Takeuchi et al. |
| 5,741,824 A | 4/1998 | Butschbacher et al. |
| 6,103,849 A | 8/2000 | Squiller et al. |
| 6,111,048 A | 8/2000 | Asahina et al. |
| 6,153,709 A | 11/2000 | Xiao et al. |
| 6,559,193 B1 | 5/2003 | Nonoyama et al. |
| 6,559,265 B1 | 5/2003 | Lamers et al. |
| 6,809,147 B1 | 10/2004 | Ohno et al. |
| 2003/0232908 A1 | 12/2003 | Eto et al. |

FOREIGN PATENT DOCUMENTS

| | | |
|---|---|---|
| CA | 2162363 | 11/1994 |
| EP | 583377 B1 | 11/1992 |
| EP | 884341 B1 | 9/1997 |
| JP | 07102213 * | 4/1995 |
| JP | 2001-059067 | 3/2001 |
| JP | 2003-268302 | 9/2003 |
| WO | WO 03/002645 | 1/2003 |

* cited by examiner

*Primary Examiner*—Rachel Gorr
(74) *Attorney, Agent, or Firm*—Stephen D. Harper

(57) ABSTRACT

Blocked polyurethane prepolymers obtained by reacting at least one polyol, a first polyisocyanate comprising diphenylmethane diisocyanate, a second polyisocyanate having a viscosity at 25° C. of less than about 250 mPa·s, a phenol blocking agent, and an oxime blocking agent, wherein the weight ratio of second polyisocyanate:first polyisocyanate is not more than 0.65:1. The blocked polyurethane prepolymers are especially useful in formulating coating compositions additionally comprising at least one acrylic resin, at least one plasticizer, at least one filler, and optionally other ingredients and additives. A cured coating is obtained by applying a layer of the coating composition to a substrate surface and heating the coating composition layer.

23 Claims, No Drawings

BLOCKED POLYURETHANE PREPOLYMERS USEFUL IN COATING COMPOSITIONS

BACKGROUND OF THE INVENTION

1. Field of the Invention

The present invention pertains to blocked polyurethane prepolymers. These prepolymers can be used as components of compositions for forming sound- and vibration-damping coatings on thin metal substrates. Such compositions are relatively low in viscosity, are comparatively inexpensive to produce, are storage-stable, and are capable of providing cured coatings upon heating that are highly adhesive and chip-resistant.

2. Discussion of the Related Art

The use of various blocked polyurethane and blocked polyisocyanate materials as components of coating and adhesive compositions, especially compositions useful for forming vibration- and sound-damping coatings on vehicle undersides and the like, is well known in the art. The blocked polyurethane or blocked polyisocyanate becomes reactive with other components of the coating composition upon heating to provide a cured coating. Examples of patent publications describing such compositions include U.S. Pat. No. 5,155,154, U.S. Pat. No. 4,977,201, U.S. Pat. No. 5,087,664, EP 884341, EP 583377, U.S. Published Application 2003/0232908, U.S. Pat. No. 6,559,193, U.S. Pat. No. 5,741,824, Japanese Publication No. 2001-059067, and Japanese Publication No. 2003-268302. However, workers in the field believe that further improvements in such systems are still needed, particularly with respect to viscosity and storage stability. That is, it would be highly desirable to develop blocked polyurethane prepolymers that not only are sufficiently low in viscosity to enable the prepolymers and coating compositions containing such prepolymers to be applied easily to substrate surfaces by spraying but also exhibit good stability during storage (e.g., no phase separation).

SUMMARY OF THE INVENTION

The present invention provides blocked polyurethane prepolymers obtained by reacting at least one polyol, a first polyisocyanate comprising diphenylmethane diisocyanate, a second polyisocyanate having a viscosity at 25° C. of less than about 250 mPa.s, a phenol blocking agent, and an oxime blocking agent, wherein the weight ratio of second polyisocyanate:first polyisocyanate is not more than 0.65:1. The blocked polyurethane prepolymers are especially useful in formulating coating compositions additionally comprising at least one acrylic resin, at least one plasticizer, at least one filler, and optionally other ingredients and additives. A cured coating is obtained by applying a layer of the coating composition to a substrate surface and heating the coating composition layer.

DETAILED DESCRIPTION OF CERTAIN EMBODIMENTS OF THE INVENTION

Suitable polyether polyols include products obtained by addition polymerization of one or more alkylene oxides such as ethylene oxide, propylene oxide, butylene oxide and the like to one or more active-hydrogen containing compounds as the initiator. Suitable initiators include polyalcohols such as ethylene glycol, diethylene glycol and other oligomers of ethylene glycol, propylene glycol, oligomers of propylene glycol, glycerol, trimethylolpropane, pentaerythritol, sugar alcohols and the like as well as polyamines such as ethylene diamine, propylene diamine and the like under alkaline or acidic conditions or using catalysts such double metal cyanide complex catalysts. If more than one alkylene oxide is reacted, the alkylene oxides may be added to the initiator in a block or random manner. The number average molecular weight of the polyether polyol(s) may be varied, but generally is selected from the range of about 200 to about 10,000. The functionality of the polyether polyol(s) may also be varied, but generally the polyether polyols will contain an average of from about 2 to about 4 hydroxy groups per molecule. In one embodiment of the invention, the polyether polyol(s) used are polypropylene glycols, in particular polypropylene glycol diols and/or triols.

In one embodiment of the invention, at least one diol and at least one triol are utilized as polyether polyol components in the preparation of the blocked polyurethane prepolymer. In another embodiment, at least one relatively low molecular weight triol (e.g., a triol having a number average molecular weight of from about 200 to about 400), at least one relatively high molecular weight triol (e.g., a triol having a number average molecular weight of from about 2000 to about 4000) and at least one moderately high molecular weight diol (e.g., a diol having a number average molecular weight of from about 500 to about 2500) are used. In certain embodiments of the invention, the weight ratio of diol(s):triol(s) may vary from about 0.1:1 to about 10:1 or from about 0.5:1 to about 5:1. In other embodiments, the equivalent ratio of diol(s):triol(s) may vary from about 0.1:1 to about 10:1 or from about 0.5:1 to about 5:1.

By using the two types of polyisocyanates described herein, it has surprisingly been found that blocked polyurethane prepolymers can be obtained at a reasonable cost that have viscosities sufficiently low that coating compositions prepared therefrom may be readily applied by spraying to substrate surfaces.

The first polyisocyanate used to prepare the blocked polyurethane prepolymer comprises a diphenylmethane diisocyanate. Any of the known or available forms or isomers of diphenylmethane diisocyanate may be employed, including monomeric diphenylmethane diisocyanate (monomeric MDI) and polymeric diphenylmethane diisocyanate (PMDI). Examples of useful diphenylmethane diisocyanate isomers include 2,4'-diphenylmethane diisocyanate, 4,4'-diphenylmethane diisocyanate, and oligomers and mixtures thereof.

The second polyisocyanate has a viscosity at 25° C. of less than about 250 mPa·s. In various embodiments of the invention, the second polyisocyanate viscosity at 25° C. is less than about 200 mPa·s, or less than about 150 mPa·s, or less than about 100 mPa·s, or less than about 50 mPa·s, or less than about 10 mPa·s. The second polyisocyanate in one embodiment is an aliphatic diisocyanate. Examples of polyisocyanates suitable for use as the second polyisocyanate include monomeric and polymeric hexamethylene diisocyanate.

The weight ratio of second polyisocyanate:first polyisocyanate should be not greater than 0.65:1. In various other embodiments of the invention, such weight ratio is not greater than 0.5:1 or 0.3:1 or 0.1:1.

At least one phenol blocking agent should be employed in the preparation of the blocked polyurethane prepolymer. Although any aromatic alcohol may be utilized for this purpose, especially preferred phenol blocking agents include phenols substituted with one to three $C_1$ to $C_{18}$ alkyl groups (where the alkyl groups can be straight chain, branched or cyclic and may, for example, contain at least 4 carbon atoms) such as nonyl phenols (e.g., p-nonyl phenol), butyl phenols (e.g., p- or o-tert butyl phenol), dodecylphenols, propyl phenols, heptyl phenols, octyl phenols, cresols, trimethylphenols, xylenol, and the like.

At least one oxime blocking agent is also used to prepare the blocked polyurethane prepolymer. Oximes useful as blocking agents according to the invention include mono alkyl and dialkyl oximes (e.g., $C_3$ to $C_6$ dialkyl ketoximes), diaryl oximes, and akylaryl oximes such as acetophenone oxime, acetone oxime, methyl ethyl ketoxime, cyclohexanone oxime, propyl aldehyde oxime, formaldoxime, butyl aldehyde oxime, cyclopentanone oxime, and benzophenone oxime.

In one embodiment of the invention, the amount of phenol blocking agent is greater (on an equivalents basis) than the amount of oxime blocking agent. For example, the equivalents ratio of phenol blocking agent:oxime blocking agent may be at least 2.2:1 or at least 4:1 or at least 6:1.

The equivalents ratio of isocyanate groups (in the polyisocyanates used to prepare the blocked polyurethane prepolymer) to hydroxyl groups (in the polyether polyol(s) used to prepare the blocked polyurethane prepolymer) may be varied, but in certain embodiments of the invention the NCO:OH equivalents ratio is within the range of from 0.8:1 to 1.2:1 or from 0.9 to 1.1:1.

The equivalents ratio of isocyanate groups to blocking agents in the starting materials used to prepare the blocked polyurethane prepolymer may also be varied as desired. In certain embodiments, however, the NCO:blocking agent equivalents ratio is within the range of from 0.8:1 to 1.2:1 or from 0.9 to 1.1:1. Depending upon the NCO:OH equivalents ratio and the NCO:blocking agent equivalents ratio selected, some portion of one or more of the starting components may be present in unreacted form in the blocked polyurethane prepolymer. For example, unreacted polyether polyol and/or unreacted blocking agent may be present.

Although the components used to prepare the blocked polyurethane prepolymer may be combined and reacted in any order or sequence, in one embodiment of the invention all of the components (i.e., the polyether polyol(s), the isocyanates and the blocking agents) are mixed together and reacted simultaneously. The mixture typically is heated to a temperature within the range of from about 30° C. to about 100° C. A catalyst may be used to accelerate the rate of reaction of the isocyanate groups. In one embodiment of the invention, heating of the starting components is continued until all or essentially all of the isocyanate groups have reacted with either the polyether polyol(s) or the blocking agent(s).

The starting materials used are preferably selected such that the viscosity of the resulting blocked polyurethane prepolymer at 23° C. is less than 500 P or 400 P or 300 P.

The blocked polyurethane prepolymers described herein are useful as components of curable coatings, sealants and adhesives and may be substituted, for example, for the blocked polyurethanes known and described previously in the art related to coatings, sealants and adhesives. In one embodiment, the blocked polyurethane prepolymers of the present invention are formulated together with at least one plasticizer, at least one acrylic polymer in finely divided form, and at least one filler to provide a heat curable composition useful in forming a coating on a substrate.

The acrylic polymer component can be a homopolymer or copolymer prepared from one or more methacrylate and/or acrylate monomers and can have a number average molecular weight of from about 40,000 to about 2,000,000. Useful monomers include, for example, $C_1$ to $C_8$ alkyl esters of acrylic acid and methacrylic acid such as methyl acrylate and methyl methacrylate, ethyl acrylate and ethyl methacrylate, n-propyl or isopropyl acrylate and methacrylate, butyl acrylate and methacrylate, 2-ethyl hexyl acrylate and methacrylate, cyclohexyl acrylate and methacrylate, hydroxyalkyl acrylates and methacrylates, and the like. One or more coupling or crosslinking comonomers may also be used to prepare the acrylic polymer such as, for example, N-vinyl imidazole, acrylic acid, methacrylic acid, and itaconic acid. The acrylic polymer may contain non-acrylate, non-coupling comonomers such as, for example, styrene, alpha-methyl-styrene, acrylonitrile, and the like. It is preferred that the acrylic polymer be in finely divided form, for example, in the form of a powder. The acrylic polymer may have a core-shell structure. The particle size may be, in one embodiment of the invention, in the range of from about 0.1 microns to about 100 microns.

At least one plasticizer may be present in such coating compositions. Suitable plasticizers include, but are not limited to, phthalates, adipates, benzoates, azelates, sebacates, glutarates, glycerol esters, monoesters of fatty acids, glycol esters, butyrates, oleates, alkyds, organic phosphates, carbonates, trimetallates, citrates, stearates, polymeric esters, alkylsulfonic esters of phenol, cresol or other aromatic alcohols, dibenzyltoluene, diphenylether, epoxidized oils, epoxy tallates, amide esters, sulfonamides and terpenes. Alkyl and aralkyl phthalates, such as dibutyl phthalate, dioctyl phthalate, butyl benzyl phthalate, and dibenzyl phthalate, are preferred, with diisononylphthalate (DINP) being especially preferred. The plasticizer or plasticizers used should be selected so as to be compatible with the acrylic resin used so that good storage stability of the coating composition is obtained. Additional selection criteria for the plasticizer include the nature of the acrylic polymer (for example, its glass transition temperature), the desired viscosity and gelation properties of the coating composition, and the required acoustic and physical characteristics of the cured coating obtained by heating the coating composition.

The coating compositions may additionally contain at least one filler, especially finely divided inorganic substances such as, for example, calcium carbonate, mica, talc, clay, silica, barium sulfate, calcium magnesium carbonate, calcium sulfate, calcium silicate, calcium oxide, titanium oxide, magnesium oxide, zinc oxide molecular sieves, hollow glass or ceramic spheres, vermiculite, diatomaceous earth and the like. Fibrous fillers may also be utilized such as, for example, glass fibers, wollastonite, alumina fibers, polymeric fibers, ceramic fibers and the like. Organic fillers such as rubber particles may also be employed.

In one embodiment of the invention, the coating composition contains at least one blowing agent, such as a latent blowing agent (one which is activated by heating the coating composition). The incorporation of a blowing agent will provide a foamed or expanded coating when cured, which may help to improve the sound damping characteristics or other properties of the coating. Chemical blowing agents are especially preferred, such as, for example, azo compounds (e.g., azodicarbonamide, azo-bis-isobutyronitrile), sulfonyl hydrazides, N-nitroso compounds, and sulfonyl semicarbazides. Expandable microspheres may also be used as blowing agents. Blowing agent accelerators may be included to affect the temperature at which the blowing agent is activated and/or the rate of gas evolution (foaming).

Additional components of the coating compositions can include Theological additives, flow modifiers, leveling agents, adhesion promoters, stabilizers, desiccants, colorants, and the like. The coating composition may, if desired, contain reactive additives or coupling agents in addition to the blocked polyurethane prepolymer such, for example, other types of blocked or microencapsulated isocyanates (e.g., oxime-blocked hexamethylene diisocyanate trimer), epoxy resins (e.g., glycidyl ethers of polyphenols such as diglycidyl ethers of bisphenol A or bisphenol F), polyaminoamides (e.g., the reaction products of polymerized or dimerized fatty acids and epoxy resins), phenolic resins, melamine resins, terpene/phenol resins, and the like. Various types of solvents (also sometimes referred to as diluents) may also be present; one or more solvents may be introduced, for example, for the purpose of improving processability or lowering the viscosity of the coating composition prior to curing. Suitable solvents include, without limitation, aliphatic and aromatic hydrocarbons (e.g., mineral spirits, naptha, hydrotreated light petroleum distillates), ketones, glycol ethers, esters, alcohols, and the like.

Preferred amounts of the various components of such coating composition are as follows (expressed in weight %):

| Component | Preferred Range | More Preferred Range |
|---|---|---|
| Blocked Polyurethane Prepolymer(s) | 1–40 | 5–30 |
| Acrylic Resin(s) | 5–30 | 10–25 |
| Plasticizer(s) | 10–40 | 15–35 |
| Filler(s) | 5–45 | 10–40 |
| Solvent(s) | 0–20 | 2–15 |
| Reactive Additive(s) | 0–10 | 0.5–6 |
| Adhesion Promotor(s) | 0–3 | 0.2–2 |
| Catalyst(s) | 0–8 | 0.5–5 |
| Colorant(s) | 0–1 | 0.05–0.5 |
| Blowing Agent(s) | 0–5 | 0.2–3 |

The coating compositions are particularly suitable for use on metal substrates (especially thin metal substrates such as sheet metal) in painted or unpainted form, especially in automobile construction. The coating composition may also be employed on plastic or fiber-reinforced plastic substrates. If desired, the substrate surface can be first treated (e.g., with a conversion coating or conditioner) and/or cleaned before applying the coating composition. In automobile construction, the coating compositions may be used as underbody protection, as hood antiflutter adhesives, as sill protection compounds, and for other adhesive, sealing and coating applications. They may also be used to seal seams such as weld seams or flange seams and as acoustically active coatings (anti-vibration compounds).

The coating weight of the coating composition on the substrate surface is typically from about 100 to about 5000 g/m$^2$. Generally speaking, the coating thickness will be in the range of from about 0.1 to about 5 mm. The coating may be applied to the substrate surface by any suitable method such as, for example, spraying, brushing, pouring, dipping, roll coating, extrusion, and the like. The coating compositions of the present invention are especially suitable for application by spraying. After a layer of the coating composition has been applied to the substrate surface, the coating composition is heated to a temperature and for a time effective to cause curing (hardening) of the composition. Typical curing conditions are from about 110 degrees C. to about 160 degrees C. for about 10 to about 60 minutes. The curing may be carried out in steps (for example, heating the composition for a time at a first relatively low temperature, followed by continued heating at a higher temperature).

EXAMPLES

Blocked polyurethane prepolymers in accordance with the invention are prepared by combining the components shown in the following table and heating until all or nearly all of the isocyanate groups present initially have reacted. The amounts of the components are given in weight percent.

| Component | Example 1 | Example 2 | Example 3 | Example 4 |
|---|---|---|---|---|
| Polyether Polyol A[1] | 14.62% | 14.43% | — | 14.27% |
| Polyether Polyol B[2] | — | — | 14.48% | — |
| Polyether Polyol C[3] | 2.50% | 2.46% | — | 2.41% |
| Polyether Polyol D[4] | — | — | 2.39% | — |
| Polyether Polyol E[5] | 43.82% | 43.22% | — | 41.92% |
| Polyether Polyol F[6] | — | — | 43.32% | — |
| p-Nonyl Phenol | 21.86% | 21.57% | 21.52% | 20.92% |
| MDI[7] | 14.83% | 13.8% | 13.77% | 12.2% |
| Zinc Neodecanoate[8] | 0.09% | 0.09% | 0.09% | 0.08% |
| Methyl ethyl ketoxime | 1.15% | 2.8% | 2.81% | 2.74% |
| HDI[9] | 1.12% | 1.64% | 1.64% | — |
| Polymeric HDI[10] | — | — | — | 5.46% |
| Viscosity at 23° C. | 250 P | 170 P | 154 P | 208 P |

[1]Polypropylene glycol triol, 970 g/eq (ARCOL LG 56, obtained from Bayer)
[2]Polypropylene glycol triol, 996 g/eq (VORANOL 230-056, obtained from Dow Chemical)
[3]Polypropylene glycol triol, 86 g/eq (ARCOL LG 650, obtained from Bayer)
[4]Polypropylene glycol triol, 85 g/eq (VORANOL 220-660, obtained from Dow Chemical)
[5]Polypropylene glycol diol, 503 g/eq (ARCOL PPG 1000, obtained from Bayer)
[6]Polypropylene glycol diol, 510 g/eq (VORANOL 220-110N, obtained from Dow Chemical)
[7]diphenylmethane diisocyanate (LUPRANATE MI, obtained from BASF)
[8]19% (BICAT Z, obtained from Shepard Chemical Company)
[9]hexamethylene diisocyanate, 49.7 mm % NCO, 84 eq. wt. (DESMODUR H, obtained from Bayer)
[10]polymeric HDI, 21.8 ± 0.7% NCO, eq. wt. 193 (DESMODUR N 3400, obtained from Bayer)

What is claimed is:

1. A blocked polyurethane prepolymer obtained by reacting at least one polyol, a first polyisocyanate comprising diphenylmethane diisocyanate, a second polyisocyanate having a viscosity at 25° C. of less than about 250 mPa·s, a phenol blocking agent, and an oxime blocking agent, wherein the weight ratio of second polyisocyanate:first polyisocyanate is not more than 0.65:1.

2. A blocked polyurethane prepolymer in accordance with claim 1 wherein the second polyisocyanate comprises a hexamethylene diisocyanate.

3. A blocked polyurethane prepolymer in accordance with claim 1 wherein the second polyisocyanate comprises monomeric hexamethylene diisocyanate.

4. A blocked polyurethane prepolymer in accordance with claim 1 wherein the weight ratio of second polyisocyanate: first polyisocyanate is not more than 0.3.

5. A blocked polyurethane prepolymer in accordance with claim 1 wherein the second polyisocyanate has a viscosity at 25° C. of less than about 100 mPa·s.

6. A blocked polyurethane prepolymer in accordance with claim 1 wherein the phenol blocking agent is a phenol having a $C_5$ to $C_{12}$ alkyl group substituted on the aromatic ring.

7. A blocked polyurethane prepolymer in accordance with claim 1 wherein the phenol blocking agent is p-nonyl phenol.

8. A blocked polyurethane prepolymer in accordance with claim 1 wherein the oxime blocking agent is a $C_3$ to $C_6$ dialkyl ketoxime.

9. A blocked polyurethane prepolymer in accordance with claim 1 wherein the oxime blocking agent is methyl ethyl ketoxime.

10. A blocked polyurethane prepolymer in accordance with claim 1 wherein a mixture of polyether polyols is used to form the blocked polyurethane prepolymer.

11. A blocked polyurethane prepolymer in accordance with claim 1 wherein a mixture of polyether polyols having molecular weights of from about 200 to about 4000 and functionalities of from about 2 to about 3 is used to form the blocked polyurethane prepolymer.

12. A blocked polyurethane prepolymer in accordance with claim 1 wherein the molar ratio of phenol blocking agent:oxime blocking agent is at least 2.2:1.

13. A blocked polyurethane prepolymer in accordance with claim 1 wherein the NCO:OH equivalents ratio prior to said reacting is from 0.8:1 to 1.2:1.

14. A blocked polyurethane prepolymer in accordance with claim 1 wherein the NCO:blocking agent equivalents ratio prior to said reacting is from 0.8:1 to 1.2:1.

15. A heat curable composition useful for forming a coating, said composition comprising:
   a). a blocked polyurethane prepolymer in accordance with claim 1;
   b). at least one plasticizer;
   c). at least one acrylic polymer in finely divided form; and
   d). at least one filler.

16. A composition in accordance with claim 15 additionally comprising at least one deblocking or curing catalyst.

17. A composition in accordance with claim 15 additionally comprising at least one epoxy resin.

18. A composition in accordance with claim 15 additionally comprising at least one blowing agent.

19. A composition in accordance with claim 15 additionally comprising at least one extender.

20. A composition in accordance with claim 15 additionally comprising at least one blocked polyisocyanate that is different from the blocked polyurethane prepolymer in accordance with claim 1.

21. A composition in accordance with claim 15 wherein calcium carbonate is at least one filler.

22. A composition in accordance with claim 15 wherein at least one plasticizer is a phthalate ester.

23. A method of forming a sound damping coating on a substrate, said method comprising applying a layer of the composition of claim 15 on said substrate and heating said layer to a temperature effective to cure said composition.

* * * * *